United States Patent [19]

Kobayashi et al.

[11] Patent Number: 4,953,026

[45] Date of Patent: Aug. 28, 1990

[54] VIDEO GHOST SIGNAL CANCELLING CIRCUIT HAVING VARIABLE DELAY LINES

[75] Inventors: Reiichi Kobayashi, Osaka; Tadaaki Tanaka, Tokyo; Fumiyoshi Sasaki, Tokyo; Tetsuro Miyazaki, Tokyo, all of Japan

[73] Assignees: NEC Home Electronics Ltd., Osaka; Nippon Hoso Kyokai, Tokyo, both of Japan

[21] Appl. No.: 274,772

[22] Filed: Nov. 23, 1988

[30] Foreign Application Priority Data

Nov. 24, 1987 [JP] Japan .................................. 62-295489

[51] Int. Cl.⁵ ............................................. H04N 5/213
[52] U.S. Cl. ....................................... 358/167; 358/905
[58] Field of Search ........................ 358/166, 167, 905

[56] References Cited

U.S. PATENT DOCUMENTS

| | | | |
|---|---|---|---|
| 3,935,536 | 1/1976 | Kimura et al. | 358/905 X |
| 4,127,874 | 11/1978 | Iwasawa et al. | 358/167 |
| 4,404,600 | 9/1983 | Murakami | 358/905 |
| 4,476,491 | 10/1984 | Murata et al. | 358/167 |
| 4,502,077 | 2/1985 | Morotomi et al. | 358/167 |
| 4,542,408 | 9/1985 | Lewis, Jr. | 358/167 |
| 4,559,560 | 12/1985 | Murata et al. | 358/167 |
| 4,575,857 | 3/1986 | Murakami | 358/905 X |
| 4,583,120 | 4/1986 | Murakami et al. | 358/167 |
| 4,698,680 | 10/1987 | Lewis, Jr., et al. | 358/166 |
| 4,727,424 | 2/1988 | Chao | 358/167 |

Primary Examiner—James J. Groody
Assistant Examiner—Mark R. Powell
Attorney, Agent, or Firm—Cushman, Darby & Cushman

[57] ABSTRACT

A video ghost signal canceling circuit which has an adding means for adding a ghost canceling signal to a digital video signal thereby canceling ghost components of the video signal, and a ghost canceling signal generation means for generating a ghost canceling signal in accordance with an output of the adding means. The ghost canceling signal generation means of the present invention comprises a variable delay filter means composed by a parallel arrangement of a plurality of variable delay lines a delay amount of which is controllable from the outside, and a plurality of transversal filters with a coefficient which is controllable, wherein each transversal filter is connected in series to corresponding variable delay line, and the adding means for adding all outputs of the variable delay filter means and for outputting a ghost canceling signal.

14 Claims, 4 Drawing Sheets 4,953,026

VIDEO GHOST SIGNAL CANCELLING CIRCUIT HAVING VARIABLE DELAY LINES

BACKGROUND OF THE INVENTION

The present invention relates to a ghost canceling system for a television signal.

Generally, a television set receives through an antenna a television signal composed by multiplying a directly received signal and delay signals which reach the antenna through several reflecting routes in which the signals are reflected by neighboring geographical features, neighboring buildings, moving vehicles or the like. Due to such delay signals, generally, multiple images may come out in some extent on the received picture. Such delay signals causing the multiple images are called "the ghost" and a phenomenon where large multiple images deteriorate the quality of the picture is called "a ghost obstacle".

Recently, there have been developed several conventional types of ghost canceling systems which cancel the above-described ghost. For example, there are conventional ghost canceling signal generation circuits for use in a ghost canceling filter circuit as shown in FIGS. 1 and 2.

In a conventional ghost canceling signal generation circuit shown in FIG. 1, a video signal including a ghost is supplied through an input terminal 41 to a shift register 42 in which the video signal which creates time series of sequential images. A tap gain control circuit 46 selects the largest tap gain from tap gains inputted through an input terminal 48 and outputs the tap gain to a plurality of multipliers 44. Simultaneously, the tap gain control circuit 46 controls a tap selection circuit 43 which supplies to the corresponding multipliers 44 the output of the respective shift register 42, which output conforms with delay information in the selected tap gain. All outputs of the multipliers 44 are added to one another by an adder 45, then the adder 45 outputs a ghost canceling signal to an output terminal 47.

On the other hand, in another conventional ghost canceling signal circuit shown in FIG. 2, a video signal including a ghost is supplied to a plurality of variable delay lines 52 through an input terminal 51. A delay amount of the signal supplied to the variable delay lines 52 is controlled by a tap gain control circuit 55 in accordance with a tap gain supplied through an input terminal 57. Each output of the variable delay lines 52 is multiplied with a tap gain outputted from the tap gain control circuit 55. All the outputs of the multipliers 53 are added to one another by an adder 54 which outputs the added signal performing as a ghost canceling signal to an output terminal 56.

The conventional ghost canceling system shown in FIG. 1 is disadvantageous in that the circuit requires a large number of the shift registers 42 and the corresponding output tap for a range of the ghost, the number of which may be larger than several hundreds. Further, the tap selection circuit 43 necessitates a number of input taps equal to that of the output tap of the shift registers 42. Hence, the components of the circuit are disadvantageously large in number and, therefore, the circuit may be intricate. A total cost for the circuit would be unduly disadvantageously increased.

On the other hand, the conventional ghost canceling system shown in FIG. 2 is so constructed that one variable delay line corresponds to one multiplier. Therefore, if there are n tap gains arranged in series n circuit necessitates the corresponding delay lines. However, an actual delay circuit may merely require a shift register having n stages. Thus, such a conventional ghost canceling system is disadvantageous in that a large number of components are necessary and, therefore, a total cost for assembling the circuit is unduly increased.

SUMMARY OF THE INVENTION

Accordingly, an object of the present invention is to eliminate the above-described problems accompanying the conventional ghost canceling systems. More specifically, an object of the invention is to provide a ghost canceling circuit which necessitates a small number of components and total cost is lowered.

The foregoing and other objects have been achieved by the provision of a ghost canceling circuit which, according to the present invention, has an adding means for adding a ghost canceling signal to a digital video signal thereby canceling ghost components of the video signal and a ghost canceling signal generation means for generating a ghost canceling signal in accordance with an output of the adding means. The ghost canceling signal generation means of the present invention comprises a variable delay filter means composed by parallely arranging a plurality of variable delay lines a delay amount of which is controllable from the outside and a transversal filter with a filter coefficient which is controllable, each of which transversal filter is connected in series to the corresponding variable delay line, and an adding means for adding all outputs of the variable delay filter means and for outputting a ghost canceling signal.

According to the present invention, in view of the fact that a plurality of tap coefficients arranged in series on time series are necessary for canceling one ghost, one filter for canceling one ghost is formed by connecting in series one variable delay line to one transversal filter.

Further, in order to cancel a plurality of ghosts, the circuit of the present invention is provided with a plurality of combinations arranged in parallel of the variable delay line and the transversal filter connected in series to the corresponding variable delay line. Then, all of the outputs of the filters are added to one another thereby producing a ghost canceling signal. In this structure, a small number of variable delay lines is required, therefore the circuit can be made with a simple structure and at a low manufacturing cost.

DESCRIPTION OF THE PREFERRED EMBODIMENTS

Figure 1:
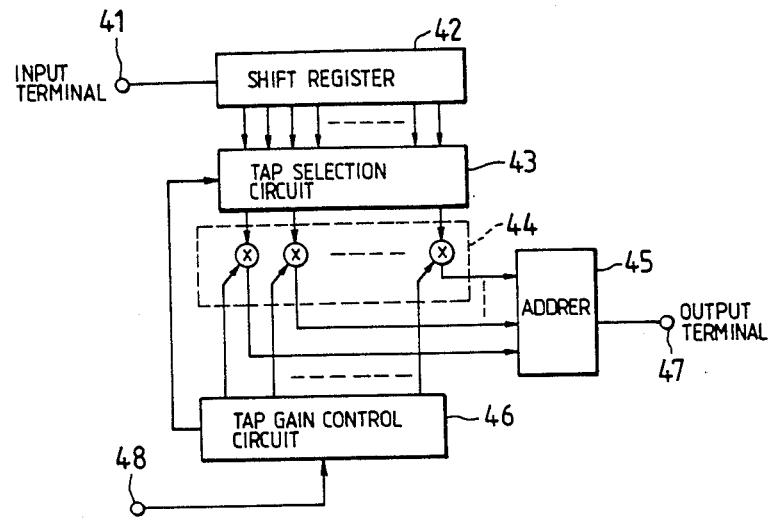
FIG. 1 is a block diagram showing a conventional ghost canceling system.
Figure 2:
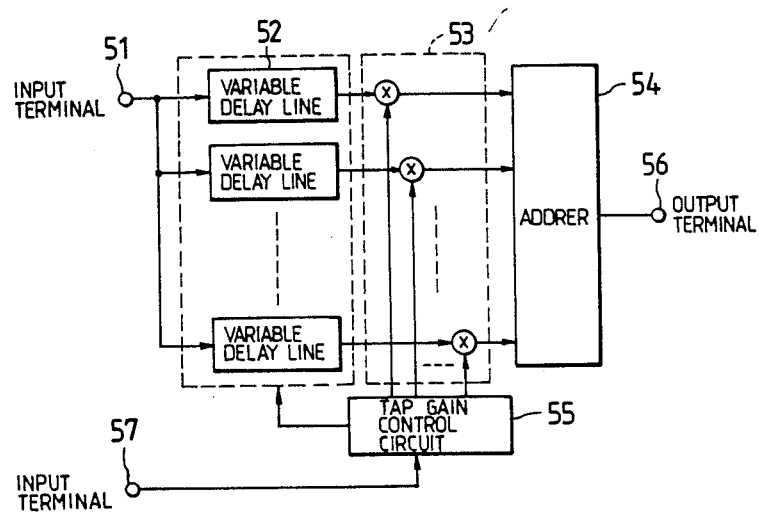
FIG. 2 is a block diagram showing another conventional ghost canceling system.
Figure 3:
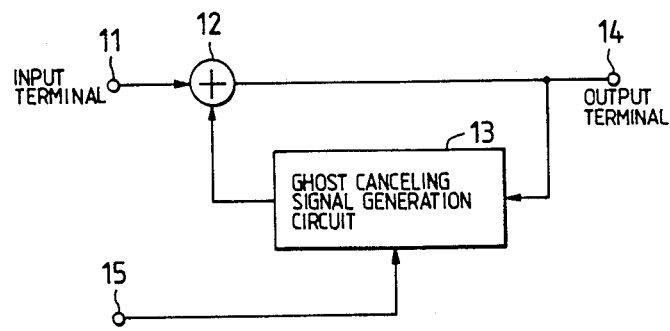
FIG. 3 is a circuit diagram showing a video ghost canceling circuit according to the present invention.

FIG. 3 is a circuit diagram showing a video ghost signal canceling circuit according to the present invention.

The ghost canceling circuit shown in FIG. 3 includes input terminals 11 and 15, an adder 12, a ghost canceling signal generation circuit 13 and an output terminal 14.

A digital video signal supplied through the input terminal 11 is added to an output of the ghost canceling signal generation circuit 13 by the adder 12. The adder 12 outputs a signal in which the ghost components have been canceled. The output signal of the adder 12 is supplied both to the output terminal 14 and to the input terminal 21 of ghost canceling signal generation circuit 13. The ghost canceling signal generation circuit 13 supplies the ghost canceling signal from output terminal 26 to the adder 12 in accordance with a ghost canceling coefficient supplied through the input terminal 15 and with the output of the adder 12.

Figure 4:
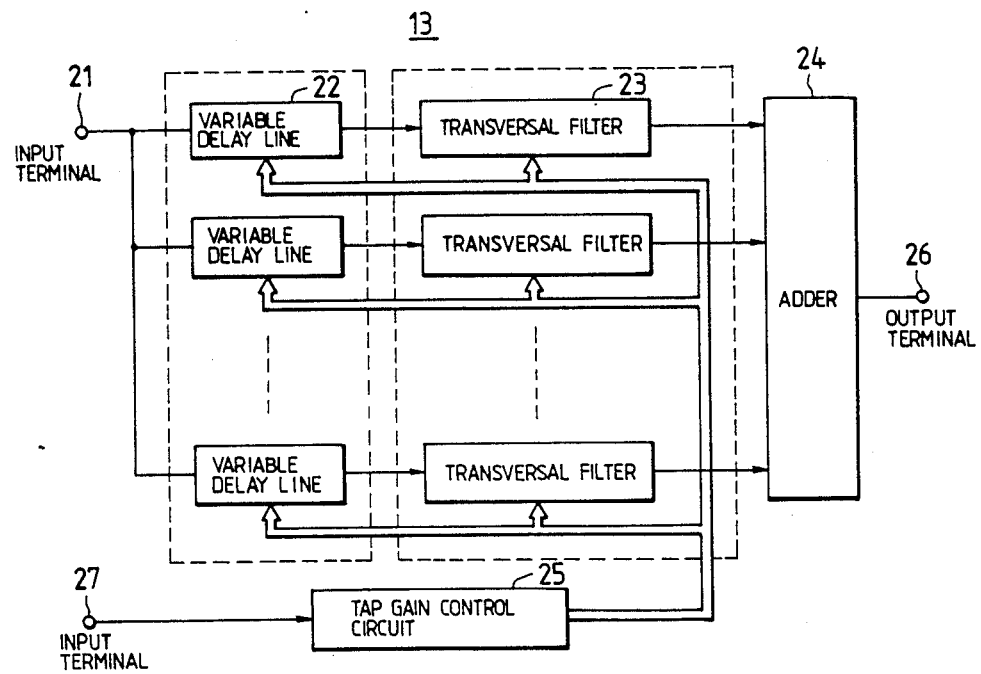
FIG. 4 is a block diagram showing a ghost canceling signal generation circuit of the present invention shown in FIG. 3.

FIG. 4 is a block diagram showing a ghost canceling signal generation circuit 13 which is an essential part of a ghost canceling filter circuit shown in FIG. 3 according to the present invention.

The ghost canceling circuit shown in FIG. 4 includes input terminals 21 and 27, a plurality of variable delay lines 22, a plurality of transversal filters 23, an adder 24, a tap gain control circuit 25 and an output terminal 26.

The output of the adder 12 shown in FIG. 3 is supplied to each of the variable delay lines 22 through the input terminal 21. A delay amount of the variable delay lines 22 is controlled by a control signal outputted by the tap gain control circuit 25. A delayed signal, that is, an output of the variable delay line 22 is supplied to the corresponding transversal filter 23. A tap gain of each of the transversal filters 23 is controlled by the control signal of the tap gain control circuit 25. Each of the transversal filters 23 supplies to the adder 24 a canceling signal which is necessary to cancel one ghost. The adder 24 adds all of the outputs of the transversal filters 23 and supplies the ghost canceling signal to the output terminal 26.

Figure 6A:
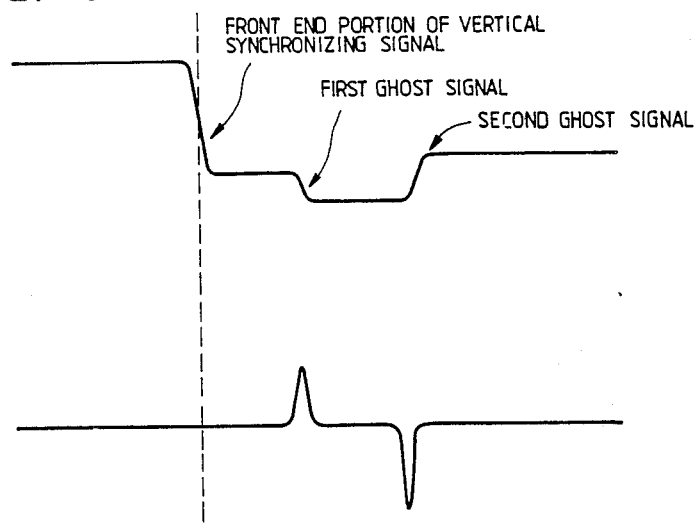
FIG. 6 illustrates a function of a tap gain control circuit shown in FIGS. 4 and 5.
Figure 6B:
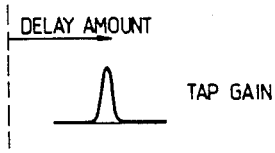
Figure 6C:
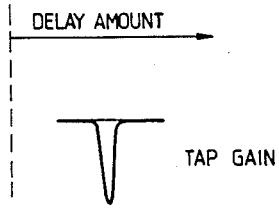

The tap gain control circuit 25 divides a ghost canceling coefficient for every one ghost wave from the ghost canceling coefficient supplied through the input terminal 27. The tap gain control circuit 25 supplies a delay amount control signal and a tap gain control signal to each of the variable delay lines 22 and each of the transversal filters 23, respectively. That is, assuming that there are two ghost waves viewing from a front end of a vertical synchronizing signal, for example as shown in FIG. 6A, the ghost canceling coefficient has two peaks as shown in FIG. 6B. In this case, the tap gain control circuit 25 divides each ghost canceling coefficient shown in FIG. 6B into one delay amount and one tap gain for one ghost wave as shown in FIG. 6C. Then, the tap gain control circuit 25 outputs a control signal including these signals to the variable delay lines 22 and to the transversal filters 23 as a respective control signal.

Figure 5:
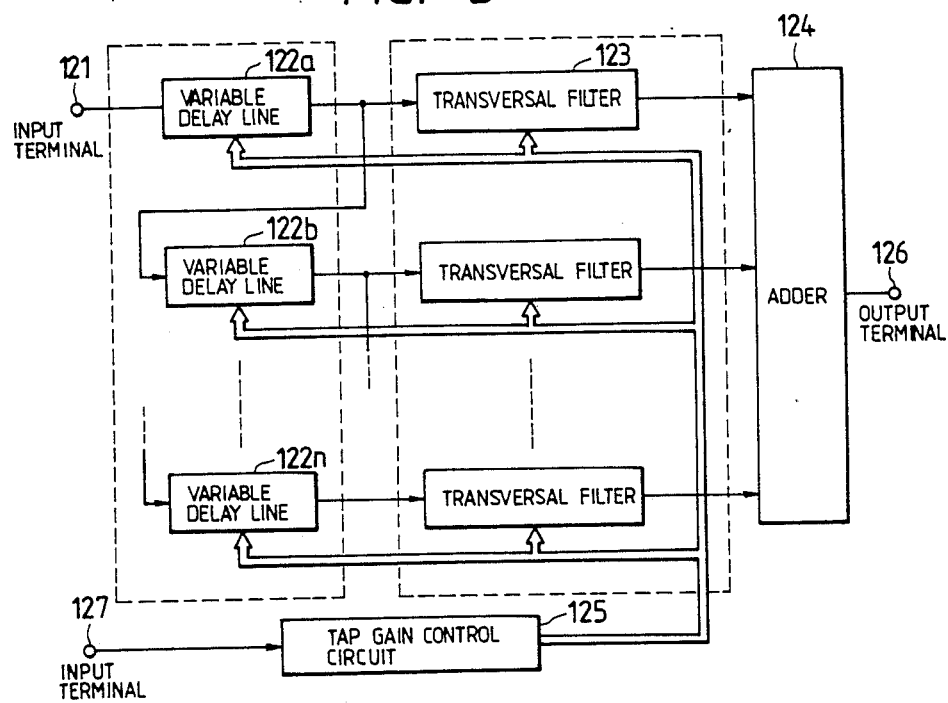
FIG. 5 is a block diagram showing another arrangement of a ghost canceling circuit of the present invention shown in FIG. 3.

FIG. 5 is a block diagram showing another arrangement of the ghost canceling circuit which is an essential part of a ghost canceling filter circuit of the present invention shown in FIG. 3.

The ghost canceling circuit shown in FIG. 5 includes input terminals 121 and 127, a plurality of variable delay lines 122, a plurality of transversal filters 123, an adder 124, a tap gain control circuit 125 and an output terminal 126.

The output of the adder 12 shown in FIG. 3 is supplied to the first variable delay lines 122a through the input terminal 121. An output of the first variable delay line 122a is supplied to a second variable delay line 121b. This connection continues until a variable delay line 121n. A delay amount of each of the variable delay lines 122 is controlled by a control signal including a delay amount control signal outputted from the tap gain control circuit 125. The delayed signal, that is, an output of each variable delay line 122 is supplied to the corresponding transversal filter 123. A tap gain of each of the transversal filters 123 is controlled by a control signal including a tap gain control signal outputted from the tap gain control circuit 125. Each transversal filter 123 outputs to the adder 124 a canceling signal of which is necessary to cancel one ghost. The adder 124 adds all the outputs of the transversal filters 123 and outputs a ghost canceling signal to the output terminal 126.

The tap gain control circuit 125 divides a ghost canceling coefficient for every one ghost wave from the ghost canceling coefficient supplied through the input terminal 127. The tap gain control circuit 125 outputs a delay amount control signal and a tap gain control signal to each of the variable delay lines 122 and each of the transversal filters 123, respectively.

Figure 7:
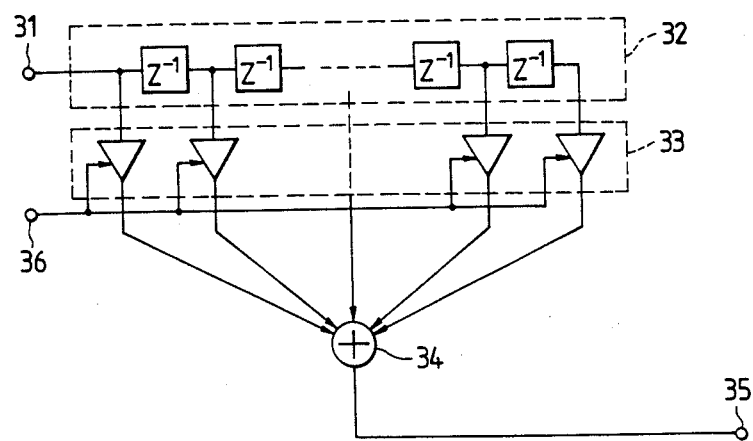
FIG. 7 is a block diagram illustrating one example of a transversal filter shown in FIGS. 4 and 5.

FIG. 7 is a block diagram showing the transversal filter 23 (123) employed in the ghost canceling signal generation circuit 13 which is one of essential components of the video ghost signal canceling circuit according to the present invention.

The transversal filter shown in FIG. 7 includes input terminals 31 and 36, a shift register 32, a plurality of multipliers 33, an adder 34 and an output terminal 35. Each output of the variable delay lines 22 (122) shown in FIG. 4 (5), respectively, is supplied to the shift register 32 through the input terminal 31. In the shift register 32, the output of the variable delay line 22 (122) is delayed by a delay amount of a sampling period on time series by a one sample delay circuit $Z^{-1}$. The delayed signals from the shift register 32 are supplied to corresponding multipliers 33. Each of the multipliers 33 inputs the control signal performing as a multiplying coefficient supplied from the tap gain control circuit 25 (125) described above through the input terminal 36. Each of the multipliers 33 multiplies the output of the shift register 32 with the multiplying coefficient and outputs a multiplied signal to the adder 34. Then, the adder 34 adds all the outputs of the multipliers 33 and outputs the added signal, that is, a ghost canceling signal for one ghost wave to the output terminal 35.

As described above, in the ghost canceling filter circuit according to the present invention, the ghost canceling signal generation circuit is composed by connecting in series a plurality of variable delay lines which are controllable from the outside in order to cancel one ghost wave to the corresponding transversal filters. Such a circuit is advantageous in that, in contrast to the conventional circuits, the circuit does not have to be provided with one variable delay line corresponding to one tap gain. Accordingly, the sufficient ghost cancel can be accomplished with a circuit simple in construction and low in manufacturing cost.

What is claimed is:

1. A circuit for cancelling a ghost from a video signal including a ghost, comprising:

means for adding a ghost cancelling signal to a video signal to be corrected, to form a corrected video signal;

ghost cancelling signal generating means, responsive to said corrected video signal, for generating said ghost cancelling signal to be added to said video signal to be corrected, including variable delay means for delaying the corrected video signal by a variable amount of time, and transversal filter connected in series to the variable delay means.

2. The ghost canceling filter circuit of claim 1, wherein said ghost canceling signal generating means further comprises:

means for controlling said variable delay means and said filter means.

3. The ghost canceling filter circuit of claim 2, wherein said variable delay means comprises a plurality of variable delay lines arranged in parallel, and said transversal filter means comprises a plurality of transversal filter devices connected in series to corresponding ones of said delay lines.

4. The ghost canceling circuit of claim 3, wherein said transversal filter means further comprises means for adding all the outputs of said plurality of transversal filter devices to produce said ghost canceling signal.

5. The ghost canceling circuit of claim 2, wherein said controlling means comprises a tap gain control circuit for generating a delay amount control signal and a tap gain control signal.

6. The ghost canceling circuit of claim 3, wherein said variable delay lines and said transversal filter devices include means responsive to an external control.

7. The ghost canceling circuit of claim 3, wherein said transversal filter means comprises a plurality of one sample delay circuits $Z^{-1}$, a plurality of multipliers, and an adder connected to add all the outputs of said multipliers.

8. The ghost canceling circuit of claim 3, wherein the output of any of said variable delay lines is supplied to a following variable delay line.

9. A circuit for canceling a ghost from a video signal including a ghost, comprising:

means for adding a ghost canceling signal to a video signal to be corrected, to form a corrected video signal;

ghost canceling signal generating means, responsive to said corrected video signal, for generating said ghost canceling signal, said ghost canceling signal generating means including delaying means for delaying the corrected video signal, and a transversal filter coupled to said delaying means, said delaying means further including a plurality of variable delay lines arranged in parallel, and said transversal filter further including a plurality of transversal filter elements each connected in series with a corresponding one of said delay lines; and means for controlling said delaying means and said transversal filter.

10. The ghost canceling circuit of claim 9, wherein said transversal filter further comprises means for adding all the outputs of said plurality of transversal filter elements to produce said ghost canceling signal.

11. The ghost canceling circuit of claim 9, wherein said controlling means comprises a tap gain control circuit coupled to said delaying means for supplying a delay amount control signal thereto, and coupled to said transversal filter for supplying a tap gain control signal thereto.

12. The ghost canceling circuit of claim 9, wherein each of said variable delay lines and said transversal filter elements include means responsive to an external control.

13. The ghost canceling filter circuit of claim 9, wherein each one of said transversal filter elements comprises a plurality of one sample delay circuits $Z^{-1}$, a plurality of multipliers each coupled to a corresponding one of said delay circuits $Z^{-1}$, and an adder connected to said plurality of multipliers for adding the outputs thereof.

14. The ghost canceling filter circuit of claim 9, wherein the output of one of said variable delay lines is supplied to another variable delay line.

* * * * *